United States Patent
Lisch

(10) Patent No.: US 10,479,014 B2
(45) Date of Patent: Nov. 19, 2019

(54) FORMING HEAD WITH INTEGRATED SEAL PIN/STRETCH ROD AND VARIOUS SEALING GEOMETRIES

(71) Applicants: DISCMA AG, Zürich (CH); G. David Lisch, Jackson, MI (US)

(72) Inventor: G. David Lisch, Jackson, MI (US)

(73) Assignee: DISCMA AG, Zürich (CH)

( * ) Notice: Subject to any disclaimer, the term of this patent is extended or adjusted under 35 U.S.C. 154(b) by 0 days.

(21) Appl. No.: 15/772,749

(22) PCT Filed: Mar. 4, 2016

(86) PCT No.: PCT/US2016/020927
§ 371 (c)(1),
(2) Date: May 1, 2018

(87) PCT Pub. No.: WO2017/078772
PCT Pub. Date: May 11, 2017

(65) Prior Publication Data
US 2018/0236706 A1 Aug. 23, 2018

Related U.S. Application Data

(60) Provisional application No. 62/250,364, filed on Nov. 3, 2015, provisional application No. 62/250,345, filed on Nov. 3, 2015.

(51) Int. Cl.
*B29C 49/12* (2006.01)
*B29C 49/46* (2006.01)
(Continued)

(52) U.S. Cl.
CPC .............. *B29C 49/46* (2013.01); *B29C 49/16* (2013.01); *B29C 49/4289* (2013.01);
(Continued)

(58) Field of Classification Search
CPC ............ B29C 49/46; B29C 2049/4664; B29C 2049/5803; B29C 2049/5868; B29C 49/58; B29C 2049/465; B29C 2049/1238
See application file for complete search history.

(56) References Cited

U.S. PATENT DOCUMENTS

| 2012/0093965 | A1* | 4/2012 | Lisch | ................. | B29C 49/58 |
| | | | | | 425/529 |
| 2012/0207872 | A1 | 8/2012 | Lisch et al. | | |
| 2013/0164404 | A1* | 6/2013 | Maki | ................. | B29D 22/003 |
| | | | | | 425/535 |

FOREIGN PATENT DOCUMENTS

| EP | 2823948 A1 | 1/2015 |
| EP | 2913173 A1 | 9/2015 |

(Continued)

*Primary Examiner* — Robert B Davis
(74) *Attorney, Agent, or Firm* — Eric J. Sosenko; Jonathan P. O'Brien; Honigman LLP

(57) ABSTRACT

A hydraulic blow molding system for forming a container from a preform by injecting a liquid product into the preform. The system includes a seal pin located within the forming head and moveable between a closed position and an opened position. In the closed position a sealing portion of the seal pin is in sealing engagement with a portion of the forming head so that an exit orifice is closed and liquid product is prevented from being injected into the preform. In the opened position, the sealing portion is disengaged from the portion of the injection head so that the exit orifice is open and the liquid product can be injected into the preform.

16 Claims, 2 Drawing Sheets

(51) Int. Cl.
    *B29C 49/58*     (2006.01)
    *B29C 49/42*     (2006.01)
    *B29C 49/16*     (2006.01)
    *B29C 49/06*     (2006.01)

(52) U.S. Cl.
    CPC .............. *B29C 49/58* (2013.01); *B29C 49/06* (2013.01); *B29C 49/12* (2013.01); *B29C 2049/1238* (2013.01); *B29C 2049/4664* (2013.01); *B29C 2049/5803* (2013.01); *B29C 2049/5868* (2013.01)

(56) References Cited

FOREIGN PATENT DOCUMENTS

| | | | | |
|---|---|---|---|---|
| JP | 2014128911 A | * | 7/2014 | ............. B29C 49/12 |
| WO | 2014/209341 A1 | | 12/2014 | |
| WO | WO-2015183280 A1 | * | 12/2015 | ............. B29C 49/12 |

* cited by examiner

FORMING HEAD WITH INTEGRATED SEAL PIN/STRETCH ROD AND VARIOUS SEALING GEOMETRIES

BACKGROUND

1. Field of the Invention

The present invention generally relates to an apparatus for forming and filling a plastic container with an end product. More specifically, the invention is related to an apparatus wherein the medium used in forming the container is the actual liquid end product contained within the container.

2. Description of Related Technologies

Plastic containers for liquid products are manufactured by various different methods. In some methods, a plastic preform is injection molded in a preform molding machine and subsequently cooled to ambient temperatures. A second machine, which may be in a remote location relative to the first machine, re-heats the preform to a suitable temperature for molding, places the thermally conditioned preform within a mold and then expands the preform, both axially and radially, to form a container. Such a process is known as a two-step molding process, and a corresponding system is known as a two-step system. In another process, the injection molding of the preform and the subsequent forming of the container all occur in the same machine or in different machines, but without allowing the preform to significantly cool and require reheating. Such processes and systems are correspondingly known as one-step processes and systems.

In either of the above processes, air has traditionally been used as the blow medium to axially and radially expand the preform and form the container. Instead of using air as the blow medium, newer processes use the liquid end product as the blow medium. The processes, apparatuses and systems that form and fill a container using the liquid end product as a liquid blow medium are generally known as liquid or hydraulic blow molding technologies. Hydraulic blow molding may also be practiced via either a two-step or one-step scheme.

As used herein, the term "liquid" is intended to encompass non-gas, flowable mediums. The liquid may therefore have a low viscosity (like water or alcohol), a medium viscosity (like edible oil or soup) or a viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

In a typical hydraulic blow molding machine, at the container forming station, a forming head is provided with an injection nozzle, a seal pin and a stretch rod. The injection nozzle is axially movable along the central axis, by an actuator, between engaged and disengaged positions where the injection nozzle seals with the preform, surfaces of a mold securing the preform or surfaces of a neck ring that secures the preform to the mold.

Defined through the interior of the injection nozzle is a central passageway. The central passageway is in communication with a source of the liquid blow medium. When provided to the central passageway, the liquid blow medium is pressurized, preferably by one of the well-known devices used for providing pressurized fluids during the molding and filling of containers. These devices include several motors, pressure pumps, pistons and other appropriate devices.

Located within the central passageway is a seal pin that is also movable between extended and retracted positions along the central axis. This movement is effectuated by an actuator that may be of any well-known variety of actuator utilized in connection with the hydraulic molding of plastic containers. Such actuators are often pneumatically driven, but may be driven by other means, including without limitation, electric motors, servomotors, magnetic or other means. The distal end of the seal pin includes a head having surfaces defining a sealing ring that engages a sealing seat provided on the nozzle and which is located adjacent to an exit orifice of the injection nozzle.

The stretch rod extends through a longitudinal bore in the seal pin. It is also extendable by an actuator (similar to the previously mentioned actuators) out of the seal pin, through the exit orifice of the nozzle and into the body of the preform. When fully extended, the stretch rod engages a closed end of the preform and axially stretches the preform to assist in forming the container.

Typically, once a mold has closed about the body of the preform, with the body of the preform being located within a mold cavity defining the shape of the desired container, the injection nozzle is lowered by the actuator to create a sealed engagement for the introduction of the liquid blow medium into the preform. At this time, the seal pin is in its extended position and sealingly engaged with the injection nozzle. Next, the stretch rod is extended by its actuator to engage the closed-end of the preform, and the seal pin is retracted by its actuator, opening the exit orifice and allowing the liquid blow medium to be injected into the preform. Simultaneously with or in advance of the opening of the exit orifice, the stretch rod may be further and fully extended to impinge the closed-end of the preform between the distal end of the stretch rod and the bottom of the mold cavity. The continued injection of liquid blow medium causes the stretched preform to axially expand into conformity with the surfaces of the mold cavity, thereby simultaneously forming and filling the container. Once formed and filled, the stretch rod is retracted and the seal pin extended to engage the injection nozzle, thereby stopping the introduction of the liquid into the container.

After the forming head and injection nozzle are retracted, the mold may be opened and the formed and filled container removed therefrom.

SUMMARY

The present invention provides, according to one aspect, a hydraulic blow molding system for forming a container from a preform by injecting a liquid product into the preform thereby expanding the preform into the shape of the container. The hydraulic blow molding system includes a forming head having a nozzle body. The nozzle body defines a central passageway terminating in an exit orifice with the central passageway defining a central axis. A source of liquid product is coupled to the forming head and is in communication with the central passageway and the exit orifice. A mold assembly having interior surfaces cooperates to define a mold cavity in the shape of the plastic container. The hydraulic blow molding system further includes a seal pin located within the forming head and moveable between a closed position and an opened position. In the closed position, a sealing portion of the seal pin is in sealing engagement with a portion of the forming head so that the exit orifice is closed and the liquid product is prevented from being injected into the preform. In the opened position, the sealing portion of the seal pin being disengaged from the portion of the injection head so that the exit orifice is open and the liquid product can be injected into the preform.

In another aspect of the invention, the sealing engagement is one of a taper-to-point engagement, a taper-to-taper engagement, a taper-to-radius engagement, a slip-fit engagement and a combined slip-fit and a taper-to-taper engagement.

In another aspect of the invention, the sealing engagement is between the seal pin and the portion of the forming head is an engagement between one of non-axially extending surfaces of the seal pin and the portion of the forming head and axially extending surfaces of the seal pin and the portion of the forming head.

In still another aspect of the invention, the sealing engagement is between the seal pin and the portion of the forming head is a sealing engagement only between non-axially extending surfaces of the seal pin and the portion of the forming head.

In a further aspect of the invention, the non-axially extending surface of the seal pin is a conical sealing surface and the non-axially extending surface of forming head is a conical or tapered sealing seat formed thereon.

In yet another aspect of the invention, the sealing engagement is between non-axially extending surfaces and axially extending surfaces of the seal pin and the portion of the forming head.

In another aspect of the invention, the sealing engagement is between the seal pin and the portion of the forming head is a sealing engagement only between axially extending surfaces of the seal pin and the portion of the forming head.

In another aspect of the invention, the seal pin is part of an integrated seal pin/stretch rod located within the forming head and being moveable between a closed position and an opened position, in the closed position a sealing portion of the integrated seal pin/stretch rod being in sealing engagement with a portion of the forming head so that the exit orifice is closed and the liquid product is prevented from being injected into the preform, in the opened position the sealing portion of the integrated seal pin/stretch rod being disengaged from the portion of the injection head so that the exit orifice is open and the liquid product injected into the preform.

In another aspect of the invention, the integrated seal pin/stretch rod is axially moveable along the central axis.

In another aspect of the invention, the sealing portion of the integrated seal pin/stretch rod is an enlargement having a radial dimension greater than an immediately adjacent portion of the integrated seal pin/stretch rod, the enlargement being spaced apart from a distal end of the integrated seal pin/stretch rod.

In another aspect of the invention, when in the closed position, at least part of the enlargement is located within a portion of the exit orifice.

In another aspect of the invention, when in the opened position, the enlargement is located along the central axis away from the nozzle body.

In another aspect of the invention, when in the opened position, the enlargement is located within the preform.

In another aspect of the invention, the enlargement is formed with a cylindrical radially facing surface.

In another aspect of the invention, the cylindrical radially facing surface defines a right circular cylinder shape.

In another aspect of the invention, the enlargement is formed with a trailing surface having is a conical shape.

In another aspect of the invention, the enlargement is formed with a trailing surface that is in sealing engagement with a portion of the injection nozzle in the closed position.

In another aspect of the invention, the trailing surface and the portion of the injection nozzle are conical in shape.

In another aspect of the invention, the forming head is incorporated into one of a two-step hydraulic blow molding apparatus or a one-step hydraulic blow molding apparatus.

In another aspect of the invention, a distal end of the integrated seal pin/stretch rod is provided as an enlarged tip and the sealing portion is axially spaced apart from the enlarged tip along the integrated seal pin/stretch rod.

In another aspect of the invention, a method of operating the hydraulic blow molding system is a hydraulic blow molding process conducted by one of a one-step hydraulic blow molding process or a two-step hydraulic blow molding process.

In another aspect of the invention, during the method of operating the hydraulic blow molding system, the sealing portion of the integrated sealing pin/stretch rod is axially moved away from the forming head during movement from the closed position to the open position and to an exterior position thereof.

DETAILED DESCRIPTION

In accordance with one aspect of the present invention, an apparatus and method is provided in which the structure and function of the seal pin and stretch rod are integrated together.

Figure 1:
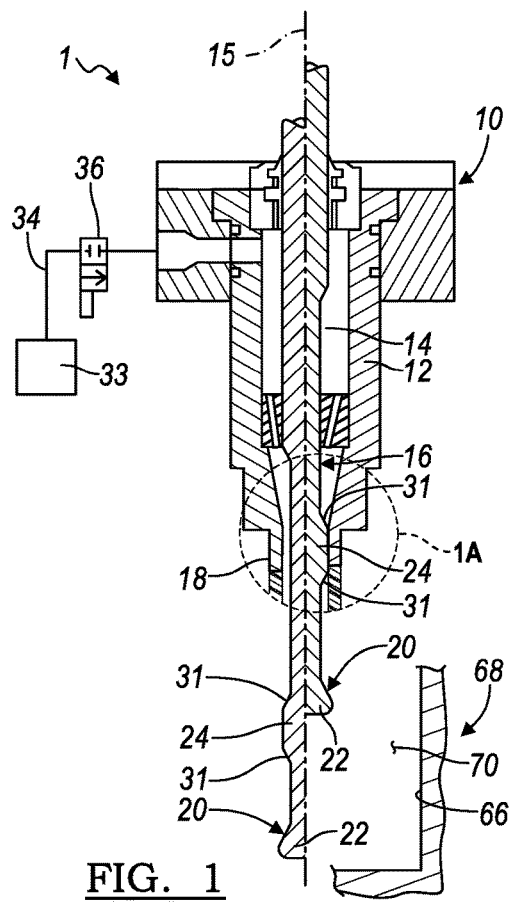
FIG. 1 is a cross-sectional view taken longitudinally through part of a forming head and having an integrated seal pin/stretch rod embodying the principles of the present invention, with a portion enlarged to show the sealing engagement.

Referring now to FIG. 1, a forming head is illustrated therein and designated at 10. The forming head 10 includes an injection nozzle or nozzle body 12 having a central passage 14 and a central axis 15 defined therein. Disposed within the central passageway 14, coaxially therewith, is an integrated seal pin/stretch rod 16, which is shown on the right-hand side of the figure in its retracted or closed position and on the left-hand side of the figure in an extended or open position. As used herein, the term integrated seal pin/stretch rod is intended to mean that the seal pin and the stretch rod are formed as a one-piece, unitary element or that the seal pin and the stretch are so linked or connected that the only move in unison with one another, not separately.

The forming head 10, nozzle body 12 and the integrated seal pin/stretch rod 16 are advanced and retracted by actuators, not shown in FIG. 1, that may be of any well-known variety of actuator utilized in connection with the blow molding of plastic containers. Such actuators are often pneumatically driven, but may be driven by other means, including without limitation, electric motors, servomotors, and magnetic, hydraulic or other means. The general construction and operation of the forming head 10 and nozzle body 12 are well known and, therefore, not described in greater detail herein.

Figure 1A:
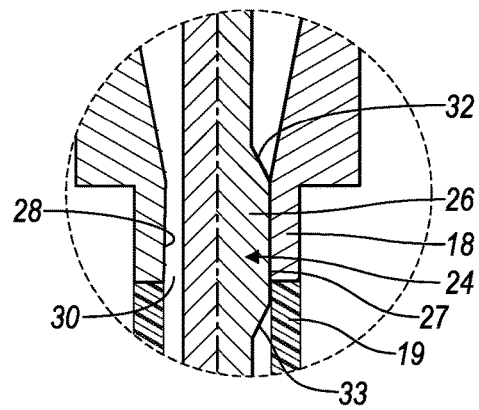
FIG. 1A is an enlarged view of a portion of FIG. 1 enclosed by circle 1A.

When the forming head 10 is extended, the nozzle body's lower end, referred to herein as a sealing bell 18, engages with or about a preform 19, as seen in FIG. 1A. The integrated seal pin/stretch rod 16, which extends from the sealing bell 18, has a distal end 20 that may initially extend into the preform 19 (generally represented by the right-hand side of FIG. 1A) when the sealing bell 18 is engaged with or about the preform 19. During the process of forming and filling the container, the integrated seal pin/stretch rod 16 is extended by its actuator such that the distal end 20 engages the closed-end of an appropriately thermally conditioned preform 19 and effectuates axial stretching of the preform 19 (generally represented by the left-hand side of FIG. 1A) within a mold cavity (not shown) that defines the shape of the desired resultant container.

As seen in the figures, the distal end 20 of the integrated seal pin/stretch rod 16 is provided in the form of an enlarged tip 22, the tip 22 being enlarged in diameter or size relative to an immediate adjacent portion of the integrated seal pin/stretch rod 16. The enlarged tip 22 may be of the same or different cross-sectional shape as the immediately adjacent portion of the integrated seal pin/stretch rod 16. When provided as an enlarged tip 22, the distal end 20 aids in the moving of the plastic material during the axial stretching of the preform 19 and can also aid in preventing the stretched sidewalls of the preform 19 from collapsing in on the integrated seal pin/stretch rod 16, in particular a sealing portion 24 thereof, which is further discussed below. Alternatively, the distal end 20 may not be enlarged, but rather of the same size or diameter as the immediately adjacent portion and provided as a generally rounded or flatten end (not shown).

At a location spaced apart from the distal end 20, the integrated seal pin/stretch rod 16 is provided with the sealing portion 24, mentioned above, which is provided as an enlargement or sealing boss 26 and readily seen in FIG. 1A. The sealing boss 26 exhibits an increased size (or width) relative to portions of the integrated seal pin/stretch rod 16 on either axial side of the sealing boss 26. The outer surface 27 of the sealing boss 26 has a cross sectional shape and size that corresponds with an inner surface 28 of the sealing bell 18. Since the inner surface 28 defines an exit orifice 30 from the central passage 14 into the preform 19 for the liquid blow medium being injected by the forming head 10, the inner and outer surfaces 27, 28 of the sealing boss 26 and sealing bell 18 form a sealing engagement that will prevent the injection of the liquid blow medium when the integrated seal pin/stretch rod 16 is in its retracted/closed position.

In a first embodiment, as seen in FIGS. 1 and 1A, portions of the inner surface 28 of the sealing bell 18 and the outer surface 27 of the sealing boss 26 define right, circular cylinders. In this area, the outer diameter of the sealing boss 26 closely corresponds with the inner diameter of the sealing bell 18 such that the sealing boss 26 closely fits within the exit orifice 30. The resultant engagement between the sealing boss 26 and the sealing bell 18 is a slip-fit, sealing engagement that will prevent the liquid blow medium from exiting through the exit orifice 30. This engagement and positioning of the sealing boss 18 is illustrated on the right-hand side of the integrated seal pin/stretch rod 16 shown in FIGS. 1 and 1A.

Shoulders 31 are formed on the upstream and downstream axial sides of the sealing boss 26 and form trailing and leading shoulders 32, 33. The shoulders 31 are provided as conical tapered portions and define a transition from the diameter of the main body of the integrated seal pin/stretch rod 16 to the enlarged diameter of the sealing boss 26. While illustrated as having a straight taper, the shoulders 31 may have other shapes and configurations, such a being concavely or convexly curved.

When the integrated seal pin/stretch rod 16 is extended and in its open position, as represented by the left-hand side of the integrated seal pin/stretch rod 16 of FIGS. 1 and 1A, the sealing boss 26 moves out of exit orifice 28 and disengages with the sealing bell 18. A passageway is thus formed between the body of the integrated sealing pin/stretch rod 16 and the sealing bell 18. With the sealing engagement disrupted, the liquid blow medium, which is provided from a source 33 through line 34 and valve 36 to the forming head 10 and into the central passageway 14, is injected into the preform 19 through the exit orifice 30. During injection of the liquid blow medium, the sealing boss 26 is therefore located within the body of the preform 19 as the preform 19 is being axially stretched by the integrated seal pin/stretch rod 16 and radially expanded by the injected liquid blow medium. The body of the preform 19 expands until contacting interior surfaces 66 of a mold assembly 68, which define a cavity 70 in the desired shape of the resultant container.

Once the container has been fully formed and filled, the integrated seal pin/stretch rod 16 is retracted and the sealing boss 26 brought back into sealing engagement with the sealing bell 18, thereby stopping the injection of the liquid blow medium. Notably, at this point during the molding process, that portion of the integrated seal pin/stretch rod 16, which is located exteriorly forming head 10, up to and including the distal end 20, is positioned within the now filled and formed container. Preferably, the volume of the container occupied by this portion of the integrated seal pin/stretch rod 16 corresponds to the desired volume of headspace in the resultant filled container. When the forming head 10 is retracted and the portion of the integrated seal pin/stretch rod 16 exterior to the forming head 10 withdrawn out of the filled container, the level of the liquid end product in the container will, accordingly, drop to the desired headspace level.

Figure 2A:
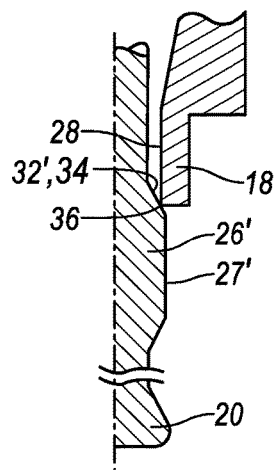
FIGS. 2A-C are cross-sectional views illustrating alternative embodiments for sealing geometries of an integrated seal pin/stretch rod embodying the principles of the present invention.
Figure 2B:
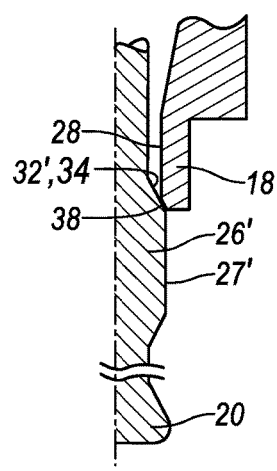
Figure 2C:
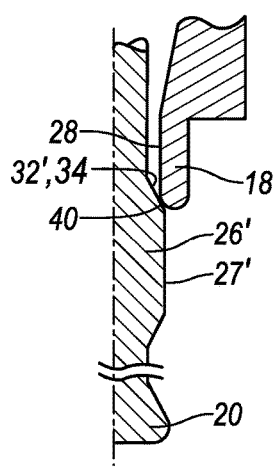

FIGS. 2A-2C illustrate alternative sealing geometries between the integrated seal pin/stretch rod 16 and the sealing bell 18.

As seen in FIG. 2A, the outer surface 27' of the sealing boss 26' exhibits an enlarged diameter relative to the inner surface 28 of the sealing bell 18. Accordingly, the sealing boss is of a size that does not allow it to be withdrawn into the portion of the sealing bell 18 defining the exit orifice 30. Instead of the outer surface 27' of the sealing boss 26' forming a sealing engagement with the inner surface 28 of the sealing bell, the trailing surface 34 of the trailing shoulder 32' (the shoulder 32' facing in the direction away from the preform 19) engages a circumferentially extending sealing edge 36 of the sealing bell 18. This sealing engagement is thus a taper-to-point engagement.

FIG. 2B exhibits a construction similar to that seen in FIG. 2A. The two constructions differ only in that instead of the sealing bell 18 engaging the trailing surface 34 via a sealing edge 36, the sealing bell 18 is provided with a correspondingly tapered surface defining a sealing seat 38. This sealing engagement is thus a taper-to-taper engagement.

FIG. 2C also exhibits a construction similar to that seen in FIG. 2A. However, instead of the sealing bell 18 engaging the trailing surface 34 via a sealing edge 36, the sealing bell 18 is provided with a radius surface 40 at its lower end and a circumferentially extending portion of the radius surface 40 engages the trailing surface 34. This sealing engagement is thus referred to as a taper-to-radius engagement.

Sealing geometries similar to those seen in FIGS. 2A-2C can also be employed in a forming head 10 where the sealing pin and stretch rod are not integrated, but rather provided as separately actuatable elements. As seen in FIGS. 3A-3E, the nozzle body 12 of the forming head 10 continues to define the central passageway 16, but the stretch rod 42 and seal pin 44 are provided as separate elements in that passageway 16. More specifically, the stretch rod 42 is received and axially moveable within a central bore 46 of the seal pin 44. In these constructions, it is the seal pin 44 that sealingly engages the sealing bell 18. Additionally, the illustrated constructions require withdrawal of the seal pin 44 in order to open the forming head 10 and inject the liquid blow medium into the preform 19. Extending of the seal pin 44 places the seal pin 44 in sealing engagement with the sealing bell 18. While not shown, it is also noted that these sealing geometries and the separate seal pin 44 and stretch rod 42 could be utilized in constructions where the seal pin 44 is extended to open and retracted to close the forming head 10, similar to that discussed in connection with FIGS. 1-2C.

Figure 3A:
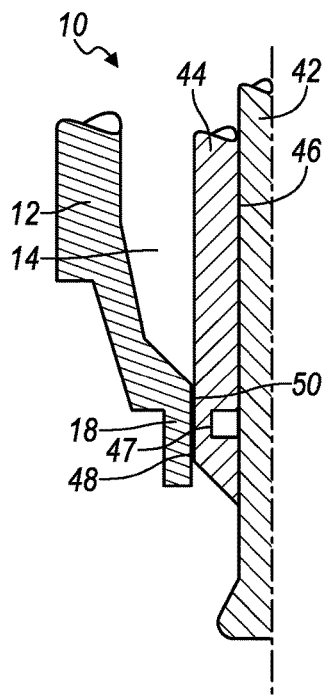
FIGS. 3A-E are cross-sectional views illustrating various embodiments for sealing geometries of a seal pin and a stretch rod according to and embodying the principles of another aspect of the present invention.

Referring now to the embodiment of FIG. 3A, at least a portion 47 of the seal pin 44 includes an outer surface 48 that is cylindrically shaped and sized to be received within a correspondingly cylindrically shaped and sized portion of the sealing bell 18 defining the exit orifice 30. The resultant engagement between the outer surface 48 of that portion 47 and the inner surface 50 of the sealing bell 18 is a slip-fit, sealing engagement that will prevent the liquid blow medium from exiting through the exit orifice 30.

Figure 3B:
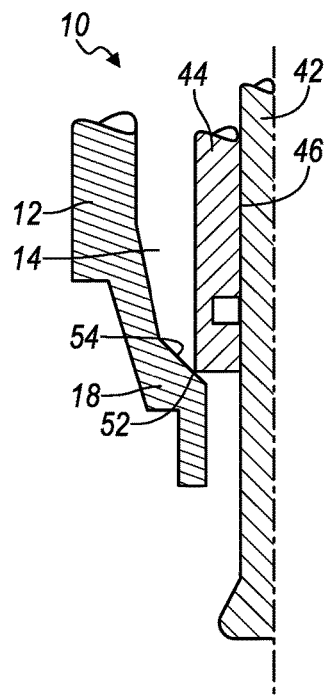

In the embodiment of FIG. 3B, the diameter or dimension exhibited by the outer surface 48' of the seal pin 44 is greater than the diameter or dimension of the inner surface 50' of the sealing bell 18. In this instance, the end of the seal pin 44 is shaped to provide a circumferentially extending sealing edge 52 that engages with a conical or tapered sealing seat 54 defined internally of the sealing bell 18. This sealing engagement is accordingly seen as a taper-to-point engagement.

Figure 3C:
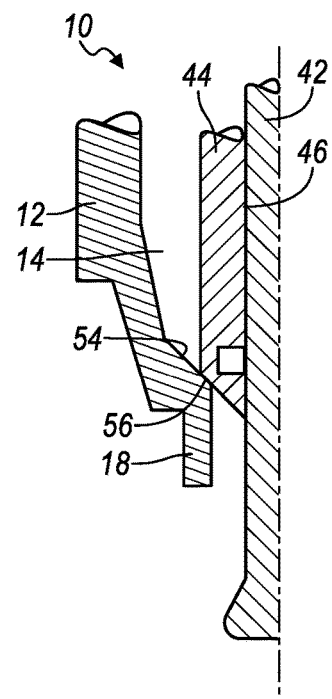

The embodiment of FIG. 3C is similar to that of FIG. 3B, except that instead of the seal pin 44 engaging the tapered sealing seat 54 of the sealing bell 18 with a sealing edge 52, the seal pin 44 is provided with a correspondingly conical or tapered surface defining a sealing surface 56. This sealing engagement is thus a taper-to-taper engagement.

Figure 3D:
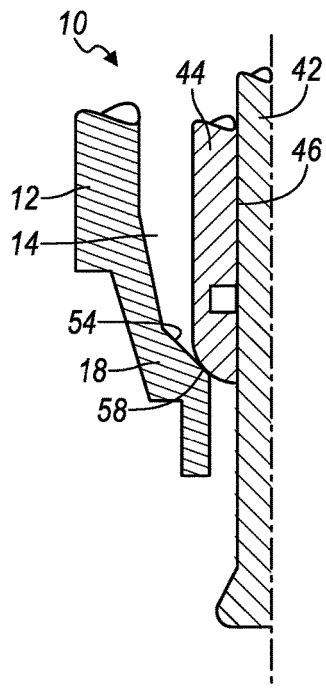

The embodiment of FIG. 3D is also similar to that of FIG. 3B. However, instead of the seal pin 44 engaging the tapered sealing seat 54 of the sealing bell 18 with a sealing edge 52, the seal pin 44 is provided with a radius surface 58 at its lower end and a circumferentially extending portion of the radius surface 58 engages the tapered sealing seat 54. This sealing engagement is thus referred to as a taper-to-radius engagement.

Figure 3E:
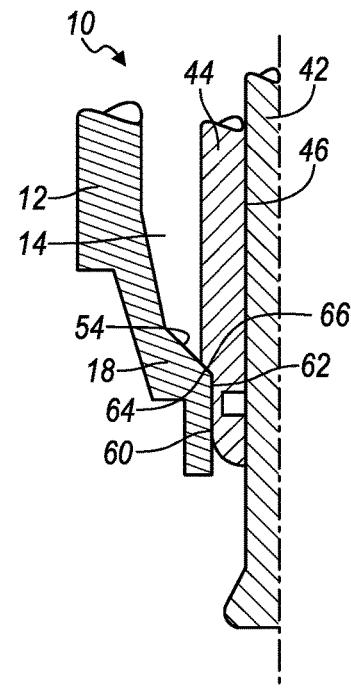

The embodiment of FIG. 3E combines features of the embodiments seen in FIGS. 3A and 3C. In this embodiment, the seal pin 44 includes both a cylindrical portion 60 received within a correspondingly shaped and sized cylindrical portion 62 of the sealing bell 18 and a conical, tapered sealing surface 64 engaging a corresponding conical tapered sealing seat 66 that is inwardly formed on the sealing bell 18. This sealing engagement is thus a combined slip-fit and a taper-to-taper engagement.

While cylindrical and conical seats and surfaces are described as the preferred shapes, it should be understood that other surface shapes and seats could likewise be provided for the surfaces and seats of the sealing bell and seal pin.

I claim:

1. A hydraulic blow molding system for forming a container from a preform by injecting a liquid product into the preform thereby expanding the preform into the shape of the container, the hydraulic blow molding system comprising:
   a forming head including a nozzle body, the nozzle body defining a central passageway terminating in an exit orifice, the central passageway defining a central axis;
   a source of liquid product coupled to the forming head and in communication with the central passageway and the exit orifice;
   a mold assembly having interior surfaces cooperating to define a mold cavity in the shape of the plastic container;
   an integrated seal pin/stretch rod located within the forming head and being moveable between a closed position and an opened position, in the closed position a sealing portion of the integrated seal pin/stretch rod being in sealing engagement with a portion of the forming head so that the exit orifice is closed and the liquid product is prevented from being injected into the preform, in the opened position the sealing portion of the integrated seal pin/stretch rod being disengaged from the portion of the injection head so that the exit orifice is open and the liquid product injected into the preform.

2. The hydraulic blow molding system according to claim 1, wherein the integrated seal pin/stretch rod is axially moveable along the central axis.

3. The hydraulic blow molding system according to claim 1, wherein the sealing portion of the integrated seal pin/stretch rod is an enlargement having a radial dimension greater than an immediately adjacent portion of the integrated seal pin/stretch rod, the enlargement being spaced apart from a distal end of the integrated seal pin/stretch rod.

4. The hydraulic blow molding system according to claim 3, wherein, when in the closed position, at least part of the enlargement is located within a portion of the exit orifice.

5. The hydraulic blow molding system according to claim 1, wherein the sealing portion of the integrated seal pin/stretch rod is an enlargement having a radial dimension greater than an immediately adjacent portion of the integrated seal pin/stretch rod, the enlargement being spaced apart from a distal end of the integrated seal pin/stretch rod, and, in the opened position, the enlargement is located along the central axis away from the nozzle body and within the preform.

6. The hydraulic blow molding system according to claim 3, wherein the enlargement is formed with a cylindrical radially facing surface.

7. The hydraulic blow molding system according to claim 6, wherein the cylindrical radially facing surface defines a right circular cylinder shape.

8. The hydraulic blow molding system according to claim 1, wherein the sealing portion of the integrated seal pin/stretch rod is an enlargement having a radial dimension greater than an immediately adjacent portion of the integrated seal pin/stretch rod, the enlargement being spaced apart from a distal end of the integrated seal pin/stretch rod, and the enlargement is formed with a trailing surface having is a conical shape.

9. The hydraulic blow molding system according to claim 8, wherein the enlargement is formed with a trailing surface that is in sealing engagement with a portion of the injection nozzle in the closed position.

10. The hydraulic blow molding system according to claim 9, wherein the trailing surface and the portion of the injection nozzle are conical in shape.

11. The hydraulic blow molding system according to claim 1, wherein the forming head is incorporated into one of a two-step hydraulic blow molding apparatus or a one-step hydraulic blow molding apparatus.

12. The hydraulic blow molding system according to claim 1, wherein a distal end of the integrated seal pin/stretch rod is provided as an enlarged tip and the sealing portion is axially spaced apart from the enlarged tip along the integrated seal pin/stretch rod.

13. A method of operating the hydraulic blow molding system according to claim 1, wherein the hydraulic blow molding process includes one of the step of hydraulic blow molding a parison as a one-step hydraulic blow molding process or hydraulic blow molding a parison as a two-step hydraulic blow molding process.

14. The method of operating the hydraulic blow molding system according to claim 13, comprising the step of axially moving the sealing portion of the integrated sealing pin/stretch rod away from the forming head during movement from the closed position to the open position and to an exterior position thereof.

15. The hydraulic blow molding system according to claim 1, wherein the integrated seal pin/stretch rod is formed as one-piece construction.

16. The hydraulic blow molding system according to claim 1, wherein the seal integrated seal pin/stretch rod are connected so as to only move in unison with one another and not separately.

* * * * *